United States Patent
Van Cleave et al.

(10) Patent No.: US 10,839,659 B2
(45) Date of Patent: Nov. 17, 2020

(54) SYSTEM FOR VIDEO MONITORING WITH IMPROVED IMAGE QUALITY

(71) Applicant: Arlo Technologies, Inc., Carlsbad, CA (US)

(72) Inventors: Todd Van Cleave, San Marcos, CA (US); Glenn Garbeil, Carlsbad, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 16/162,511

(22) Filed: Oct. 17, 2018

(65) Prior Publication Data

US 2020/0126378 A1    Apr. 23, 2020

(51) Int. Cl.
| | |
|---|---|
| *H04N 7/18* | (2006.01) |
| *G08B 13/196* | (2006.01) |
| *H04N 5/33* | (2006.01) |
| *H04N 5/14* | (2006.01) |
| *G06T 5/00* | (2006.01) |
| *H04N 5/225* | (2006.01) |

(52) U.S. Cl.
CPC .......... *G08B 13/19602* (2013.01); *G06T 5/00* (2013.01); *H04N 5/144* (2013.01); *H04N 5/33* (2013.01); *G06T 2207/10048* (2013.01); *G06T 2207/30232* (2013.01); *H04N 5/2254* (2013.01)

(58) Field of Classification Search
CPC .......... H04N 5/23212; H04N 5/23293; H04N 5/332; H04N 5/2258; G02F 1/19; G01C 3/08

See application file for complete search history.

(56) References Cited

U.S. PATENT DOCUMENTS

| | | | |
|---|---|---|---|
| 7,535,002 B2 | 5/2009 | Johnson et al. | |
| 7,538,326 B2 | 5/2009 | Johnson et al. | |
| 8,374,438 B1* | 2/2013 | Wagner | H04N 5/33 250/330 |
| 8,443,470 B2 | 5/2013 | Lu et al. | |
| 8,780,161 B2 | 7/2014 | Samadani et al. | |
| 9,635,282 B2 | 4/2017 | McManus et al. | |
| 2003/0146920 A1* | 8/2003 | Tezuka | G09G 5/36 345/629 |

(Continued)

FOREIGN PATENT DOCUMENTS

| | | |
|---|---|---|
| CN | 102685373 A | 9/2012 |
| CN | 205453894 U | 8/2016 |
| EP | 0 343 634 A2 | 5/1989 |

*Primary Examiner* — Peet Dhillon
(74) *Attorney, Agent, or Firm* — Boyle Fredrickson S.C.

(57) ABSTRACT

In an electronic video monitoring system for security and surveillance, a recording device can improve image quality, particularly in a night mode, while conserving battery power, by repeatedly activating an infrared (IR) light while capturing a video image, then deactivating the IR light and activating a visible light while capturing another video image, then blending the captured images to produce a blended video image. The blended video image can provide color in a foreground for improved detail where such detail is typically most important and grayscale in a background for effective monitoring of a broad field of view. The IR and visible lights can be controlled by Pulse-Width Modulation (PWM) signals having duty cycles which can differ in various modes to achieve differing effects.

16 Claims, 6 Drawing Sheets

(56) References Cited

U.S. PATENT DOCUMENTS

| | | | |
|---|---|---|---|
| 2008/0309914 A1 | 12/2008 | Cantin et al. | |
| 2014/0368641 A1* | 12/2014 | Strandemar | H04N 5/33 |
| | | | 348/136 |
| 2016/0062103 A1* | 3/2016 | Yang | A61B 5/0071 |
| | | | 250/552 |
| 2017/0230551 A1* | 8/2017 | Akkaya | H04N 9/045 |
| 2019/0259366 A1* | 8/2019 | Hansson | G10K 11/17873 |
| 2019/0306220 A1* | 10/2019 | Aldover | H04L 65/80 |

\* cited by examiner

SYSTEM FOR VIDEO MONITORING WITH IMPROVED IMAGE QUALITY

BACKGROUND OF THE INVENTION

1. Field of the Invention

The present invention relates to an electronic video monitoring system, and more particularly, to an electronic video monitoring system and method which improve image quality by activating an infrared (IR) light while capturing a video image, then deactivating the IR light and activating a visible light while capturing another video image, then blending the captured images for an encoded media stream.

2. Discussion of the Related Art

Cameras have long been used as part of monitoring and/or surveillance systems. More recently, cameras have been coupled with electronic sensors to detect triggering events, such as a detected motion, to allow recording of an area after a triggering event has occurred. Such cameras have also been wirelessly connected to computers with network access to allow users to remotely monitor areas with electronic devices such as a smart phones and tablet computers. In these systems, real-time or live monitoring of events is possible with the benefit of high-speed network connections.

Video monitoring at nighttime can be particularly difficult due the decreased amount of ambient lighting that is typically available. It is known to activate an infrared (IR) light while capturing video images to improve image quality. However, while video images obtained in this way provide improved detail, they are typically limited to a "greyscale" in which the value of each pixel represents only an amount of light received, thereby giving a "black and white" appearance.

Also, to provide monitoring and/or surveillance in remote locations, such cameras are oftentimes completely wireless and thereby limited by their own on-board battery power as well. These power limits impose constraints on available lighting in terms of both intensity and time.

It is therefore desirable to provide a system for monitoring and/or surveillance using with cameras, including for use in remote areas and at nighttime, which improves image quality.

SUMMARY OF THE INVENTION

In an electronic video monitoring system for security and surveillance, a recording device can improve image quality, particularly in a night mode, while conserving battery power, by repeatedly activating an infrared (IR) light while capturing a video image, then deactivating the IR light and activating a visible light while capturing another video image, then blending the captured images to produce a blended video image. The blended video image can provide color in a foreground for improved detail where such detail is typically most important and grayscale in a background for the effective monitoring of a broad field of view. The IR and visible lights can be controlled by Pulse-Width Modulation (PWM) signals having duty cycles which can differ in various modes to achieve differing effects.

In one aspect, the present invention can provide an enhancement to night video quality. A white (visible light) LED (Light Emitting Diode) or spotlight can be used in combination with IR/night vision to collect images using different light sources to blend both IR and color images to create an enhanced (visually improved) video image. By blending the images, a richer, more valuable experience in night mode can be created by enabling some of the blended image/video to contain color on closer objects.

In many locations where security cameras are positioned, there may be some low level of ambient light. However, this level of ambient light may not be sufficient to enable the production of color video. By selectively activating white LED's, color features can be captured over a limited range. To minimize excessive current draw, the IR and white LED's can be selectively synchronized with frame captures, and a blending function similar to High Dynamic Range (HDR) blending can execute to blend the night vision (IR image) with the day mode image (color using light LED's). Moreover, modulation of the IR and white LED's could coincide with the frame capture rate to improve battery life in such cameras that are battery powered devices.

In one aspect, a color image can be captured with a minimum use of the white LED (a narrowest possible duty cycle) to minimize visible perception of the white LED if such perception is undesirable. Moreover, intensity of the white LED can be user selectable. For example, in one situation, it might be desirable to notify a person with the white LED, such as for an intruder, and in another situation, it might be desirable to capture enhanced images without the location of the camera becoming known.

Accordingly, by enhancing the control and timing of each different type of LED illumination (IR or white LED's, for example), images captured within each different type of illumination can be processed and blended to create an enhanced, more valuable video for our customers. The white LED's can provide a chrominance component of the video. The IR LED's can provide a luminance component of the video. The "blended" image could enable the ability to better identify potential intruders, such as skin tone, clothing and shoe color, and the like.

Specifically then, one aspect of the present invention can provide a system for video monitoring, including: a recording device configured to capture video images for an encoded media stream, the recording device having an IR light, a visible light and a processor executing a program stored in a non-transient medium to: activate the IR light while capturing one or more video images in an active IR light cycle and deactivate the IR light while capturing one or more video images in an inactive IR light cycle following the active IR light cycle; activate the visible light while capturing one or more video images in an active visible light cycle and deactivate the visible light while capturing one or more video images in an inactive visible light cycle following the active visible light cycle, in which the active visible light cycle occurs during the inactive IR light cycle, and in which the active IR light cycle occurs during the inactive visible light cycle; and blend a video image captured during the active IR light cycle with a video image captured during the active visible light cycle to produce a blended video image for the encoded media stream.

Another aspect of the invention can provide a method for video monitoring using a recording device for capturing video images for an encoded media stream, the recording device having an IR light and a visible light, the method including: activating the IR light while capturing one or more video images in an active IR light cycle and deactivating the IR light while capturing one or more video images in an inactive IR light cycle following the active IR light cycle; activating the visible light while capturing one or more video images in an active visible light cycle and deactivating the visible light while capturing one or more video images in an inactive visible light cycle following the active visible light cycle, in which the active visible light cycle occurs during the IR light cycle, and in which the active IR light cycle occurs during the inactive visible light cycle; and blending a video image captured during the active IR light cycle with a video image captured during the active visible light cycle to produce a blended video image for the encoded media stream.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
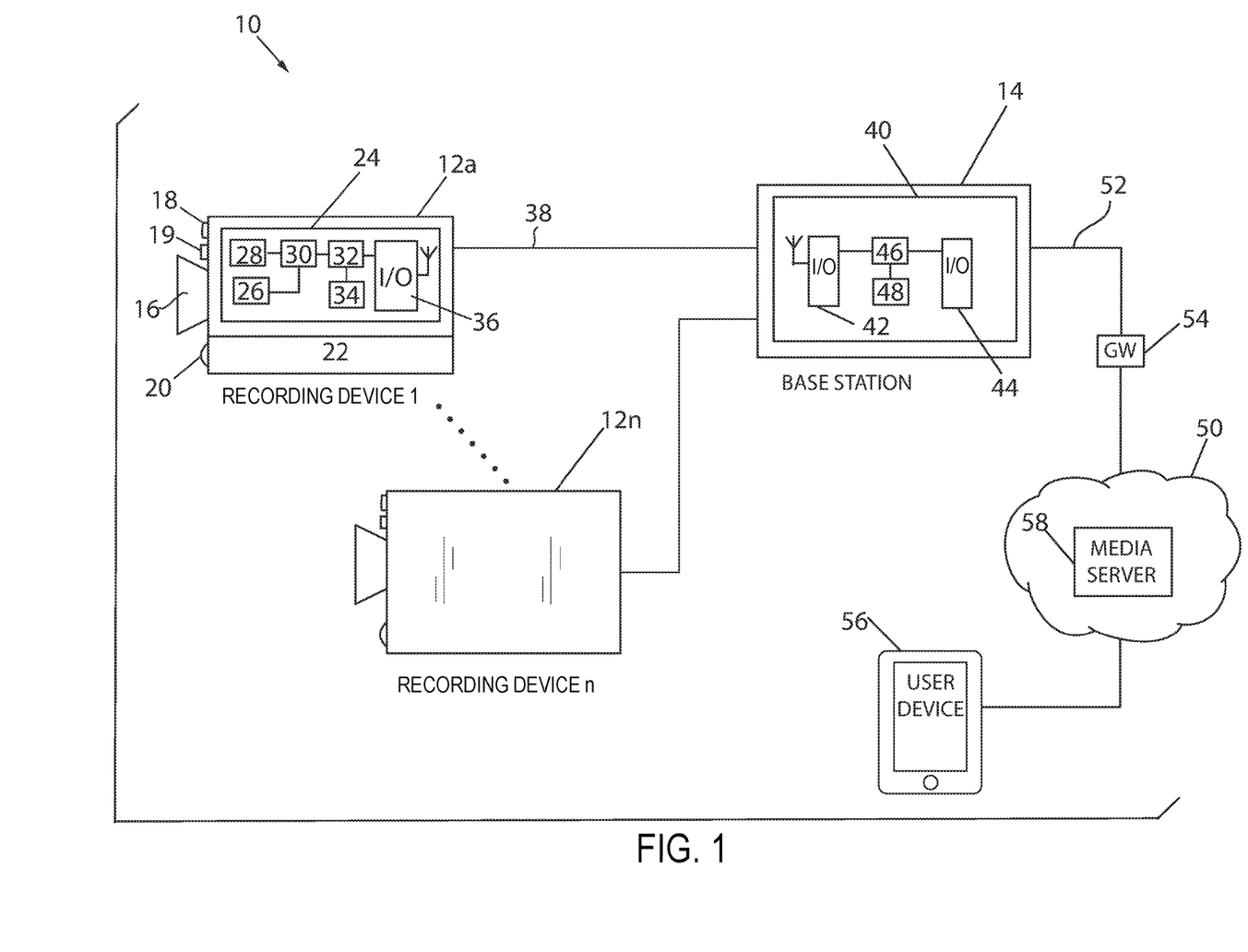
FIG. 1 is a schematic representation of a system for video monitoring, including multiple recording devices in communication with a base station, in accordance with an aspect of the invention.

Referring now to FIG. 1, in accordance with an aspect of the invention, an electronic system for video monitoring 10, usable for example for security and surveillance, can include multiple recording devices 12, such as a first recording device 12a through a last recording device 12n, in communication with a base station 14. Each recording device 12 could be a wired or wireless digital video recording device including a camera 16, a microphone 18, one or more infrared (IR) lights 19 (which can produce light in the IR spectrum with wavelengths from about 700 nanometers to about 1 millimeter), one or more visible lights 20 (which can produce light in the visible spectrum with wavelengths from about 400 nanometers to about 700 nanometers), a power supply 22 and/or recording device electronic circuitry 24, including an imager 26, audio circuit 28, media encoder 30, processor 32, non-transient memory storage 34 and/or I/O communication device 36, among other things. The one or more infrared (IR) lights 19 and the one or more visible lights 20 can be used to improve image quality as will be described herein. The one or more visible lights 20 can also be selectively used as a spotlight, with continuously active operation, as may be desired by a user, so as to bring attention to the recording device 12. In one configuration, brightness of the one or more visible lights 20 can also be adjusted as may be desired by user. Activation of the spotlight, and/or adjustment of brightness, can be commanded, for example, from the user's device 56.

It should be apparent that "circuitry" in this regard can comprise hardware, firmware, software, or any combination thereof. Each recording device 12 can be in communication with the base station 14 through a network such as a private network connection 38, hosted by the base station 14 operating as an access point. Although the network connection 38 could be a wired network connection, such as an IEEE 802.3 Local Area Network (LAN) connection, the network connection 38 of this embodiment is a wireless network connection, such as an IEEE 802.11 Local Area Network (LAN) Wi-Fi connection.

The base station 14 can include base station electronic circuitry 40, including a first (wired or wireless) I/O communication device 42 for communicating with the recording devices 12 over network connections 38, a second (wired or wireless) I/O communication device 44 for accessing a Wide Area Network (WAN) 50, such as the Internet through Local Area Network (LAN) 52 connected to a Gateway and/or Router 54, a processor 46 and/or a non-transient memory storage 48, among other things. In one aspect, the recording devices 12 could be Arlo® cameras, and the base station 14 could be an Arlo base station, each as part of an Arlo Smart Security System as available from Netgear, Inc. of San Jose, Calif.

In operation, each recording device 12 can be configured through suitable mounting of the recording device 12 and/or through suitable manipulation of its controls, to monitor an area of interest or field of view, such as a part of a building or section of property. When a recording device 12 is commanded by a user-operated device, such as a smart phone, tablet, laptop, PC or other Nex communicating with the base station 14 through the WAN 50, and/or when a recording device 12 independently detects motion and/or sound, the recording device 12 can video and/or audio ("media") stream motion and/or sound captured in real-time back to the base station 14 and ultimately the user's device 56 for viewing in real-time or close to real-time. As used herein, "real-time" refers to live video streaming with minimal latencies which may be compatible with the Internet Protocol (IP) suite, including the Real-time Transport Protocol (RTP) and Real Time Streaming Protocol (RTSP), whose specifications are well known.

In particular, the processor 32 of a recording device 12 can execute a program stored in the non-transient memory storage 34 to respond to a command from a user and/or independently detect motion and/or sound. The camera 16 can then capture video images at a resolution and frame rate in a raw video stream which, in turn, can be provided to the media encoder 30 for producing video packets in an encoded video stream. Similarly, the microphone 18 and the audio circuit 28 can capture sound in a raw audio stream which, in turn, can be provided to the media encoder 30 for producing audio packets in an encoded audio stream. Accordingly, the video and/or audio packets, referred to herein as "media" packets, are provided in an encoded media stream. Each media packet can include a sequence number indicating a relative order of the media packet in the encoded media stream for subsequent streaming. As configured, under control of the processor 32 executing the program, the encoded media stream can be transmitted from the I/O communication device 36 to the base station 14.

The media encoder 30 can use RTP to produce the media packets as RTP packets. In one aspect, the media encoder 30 can prepare the encoded media stream using H.264, a well-known block-oriented motion-compensation-based video compression standard. Also, in delivering the encoded media stream, the recording device 12 can operate as a server according to RTSP, a network control protocol designed for use in entertainment and communications systems to control streaming media servers. Each recording device 12 can transmit media packets to the base station 14 over a dedicated User Datagram Protocol (UDP) connection (implemented with respect to the network connection 38) between the recording device 12 and the base station 14.

The processor 46 of the base station 14 can execute a program stored in the non-transient memory storage 48 to receive the media packets from the recording device 12 in the encoded media stream, and it can send the encoded media stream to a media server 58 hosted in the WAN 50. In receiving the encoded media stream from the recording device 12, the base station 14 can operate as an RTSP client of the recording device 12. In addition, in delivering the encoded media stream to the media server 58, the base station 14 can operate as an RTSP client to the media server 58, pushing content to the media server 58. The media server 58, in turn, can operate as an RTSP server for the user's device 56 to provide real-time streaming to the user.

Figure 2:
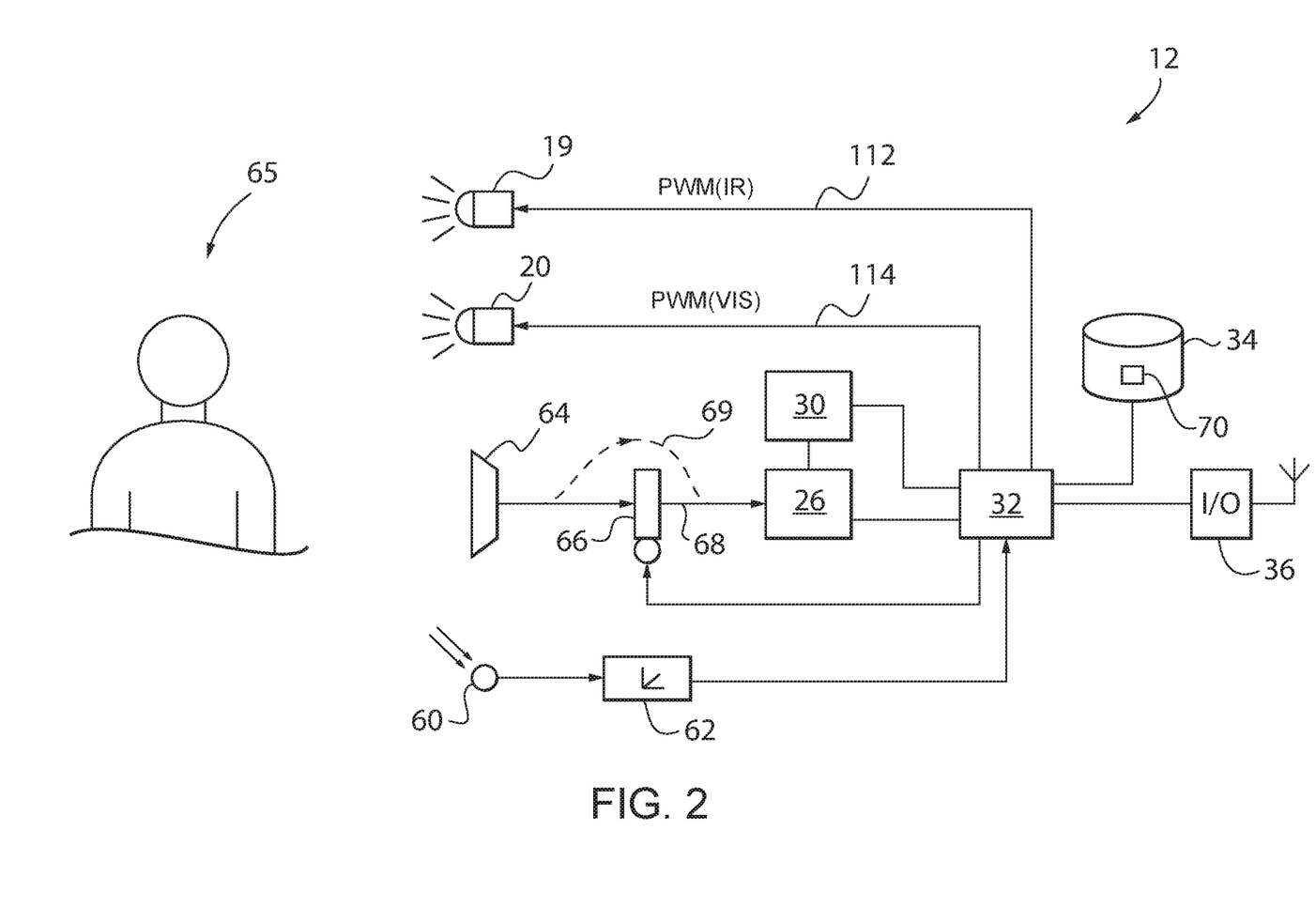
FIG. 2 is a schematic representation of an exemplary recording device of the system of FIG. 1.

Referring now to FIG. 2, a schematic representation of an exemplary recording device 12 in the system of FIG. 1 is provided in accordance with an aspect of the invention. The recording device 12 can include an ambient light sensor 60, which could comprise, for example, a phototransistor, photodiode or other device which may convert light into a corresponding electrical current. The ambient light sensor 60 can provide a signal indicating an amount of ambient light to a threshold detector 62. Sources of ambient light may include, for example, direct or indirect sunlight, moonlight, and/or other illumination sources, such as porch lights, headlights, flashlights, and the like. The threshold detector 62 can be calibrated for determining, in some aspects with hysteresis, whether ambient light indicated by the signal is sufficiently above a threshold, which may correspond to a "day mode," or sufficiently below a threshold, which may correspond to a "night mode." Hysteresis can provide state-dependent upper and lower thresholds to prevent undesirable frequent switching between modes when ambient light fluctuates. For example, when operating in the day mode, switching to the night mode may require ambient light to fall below a lower threshold. Similarly, when operating in the night mode, switching to the day mode may require ambient light to rise above an upper threshold that is greater than the lower threshold. The threshold detector 62 can provide a result to the processor 32.

The recording device 12 can also include a lens 64 for capturing light in a field of view 65. Such light, in turn, can be provided to the imager 26 for capturing video images. In one aspect, the imager 26 could comprise an RGB (Red, Green and Blue) color image sensor. When operating in the "day mode," the processor 32 can control mechanical operation of an IR cut-off filter 66 so that light from the lens 64 passes through the IR cut-off filter 66 in a first path 68 to the imager 26 to minimize capture of IR light. Conversely, when operating in the "night mode," the processor 32 can control mechanical operation of the IR cut-off filter 66 so that light from the lens 64 bypasses the IR cut-off filter 66 in a second path 69 to the imager 26 to allow capture of IR light. However, in another aspect, the imager 26 could comprise an RGB-IR (Red, Green, Blue and Infrared) image sensor in which the IR cut-off filter 66 is omitted with only the first path 68 to the imager 26. In either case, as will be described herein, the processor 32 can execute a program 70 stored in the non-transient memory storage 34 to control the IR lights 19, the visible lights 20, the imager 26, and the media encoder 30 to improve image quality, particularly in the "night mode," for ultimately producing an encoded media stream with improved video images which may be transmitted by the I/O communication device 36.

Figure 3:
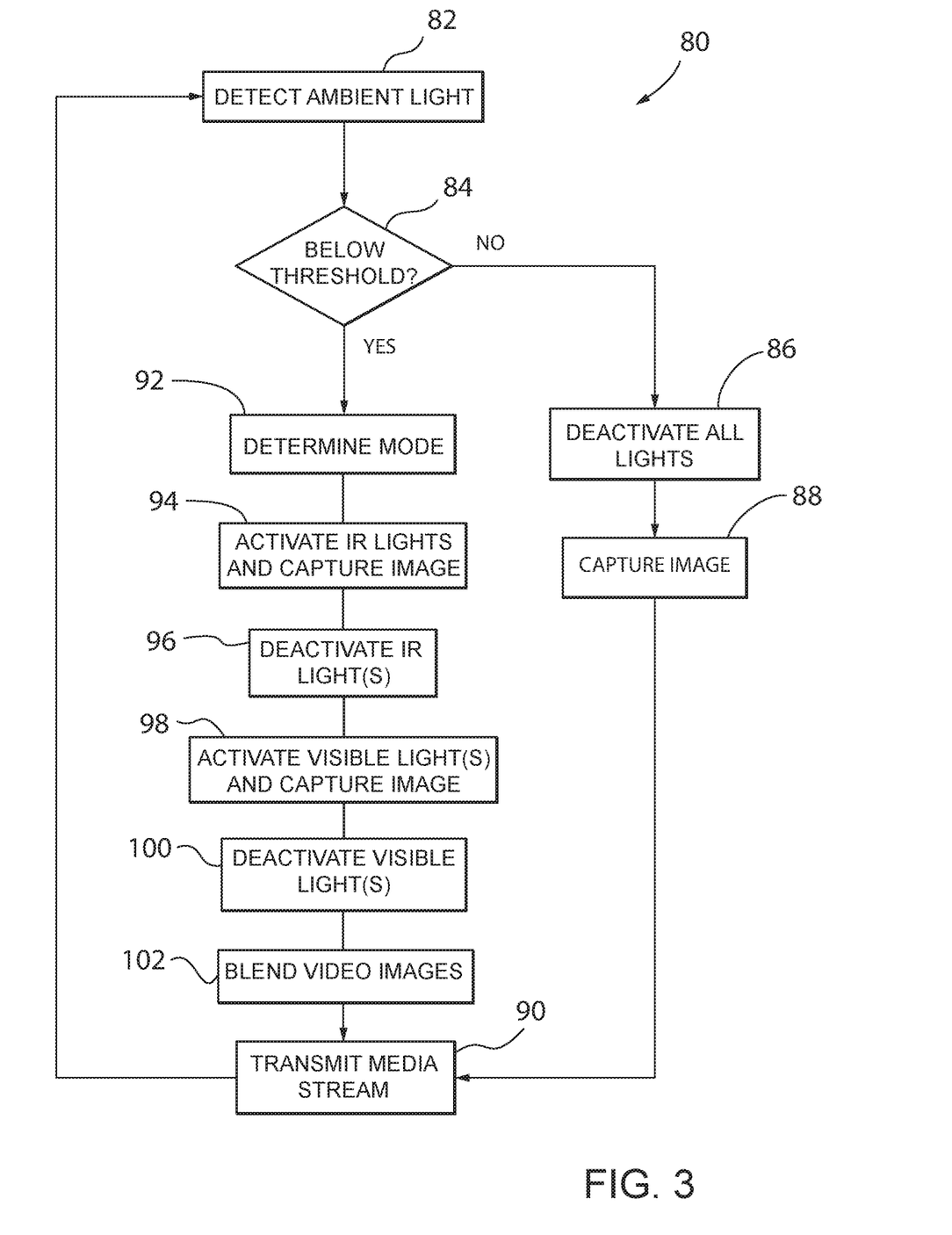
FIG. 3 is a flow diagram illustrating video monitoring with improved image quality, particularly in a night mode, in accordance with an aspect of the invention.

With additional reference to FIG. 3, the recording device 12, through the processor 32 executing the program 70, can control the IR lights 19, the visible lights 20, the imager 26 and the media encoder 30 to implement a process 80 for video monitoring with improved image quality. At step 82, the recording device 12 can detect an amount of ambient light from the ambient light sensor 60. Then, at decision step 84, the recording device 12 can determine whether the ambient light detected is sufficiently below a threshold, with hysteresis, through the threshold detector 62. If the ambient light is not sufficiently below the threshold ("No"), the recording device 12 can interpret this to mean sufficient ambient light exists for proceeding in the "day mode." Accordingly, the recording device 12 can proceed to step 86 in which all lights, including the IR lights 19 and the visible lights 20, are deactivated. Then, the recording device 12 can proceed to step 88 in which one or more images are captured by the imager 26, with the lights off, for producing the encoded media stream by the media encoder 30. Then, at step 90, the recording device 12 can transmit the encoded media stream via the I/O communication device 36, and return to step 82, detecting ambient light, and decision step 84, determining sufficiency of such ambient light, in a day mode loop. This loop can continue as long as sufficient ambient light is being detected by the recording device 12.

However, if, at decision step 84, the recording device 12 instead determines that the ambient light is sufficiently below the threshold ("Yes"), the recording device 12 can interpret this to mean that there is insufficient ambient light for proceeding in the "day mode," and that the recording device 12 should instead proceed in the "night mode." In this case, the recording device 12 can proceed to step 92 in which a mode for operating the IR lights 19 and the visible lights 20 is determined. The mode for operating the lights could be sent by a command from a user, for example, by selecting from among several selections presented to the user on a screen of the user's device 56. Alternatively, the mode for operating the lights could be automatically determined according to predetermined criteria, such as a previous selection, a default selection, a time of day and/or a location. The modes for operating the lights could include, for example: a first mode, described in more detail below with respect to FIGS. 4A and 4B, which could be preferred for producing an improved image with optimum near field image quality with rapid visible light; a second mode, described in more detail below with respect to FIGS. 5A and 5B, which could be preferred for producing an improved image with less visible light overall; and/or a third mode, described in more detail below with respect to FIGS. 6A and 6B, which could be preferred for producing an improved image with longer durations of visible light. It should be appreciated that many variations of the aforementioned modes for operating the lights, and/or additional modes, could be implemented within the spirit of the invention.

After determining a mode for operating the lights at step 94, the recording device 12 can proceed to step 94 in which the IR lights 19 can be activated in the determined mode or a pre-set mode while capturing one or more video images by the imager 26 in an "active IR light cycle." The active 1R light cycle can last for one or more video image captures depending on the mode for operating the lights. Then, following the active IR light cycle, at step 96, the IR lights 19 can be deactivated in an "inactive IR light cycle" which can also last for one or more video image captures depending on the mode for operating the lights. Then, following the inactive IR light cycle, at step 98 the visible lights 20 can be activated while capturing one or more video images by the imager 26 in an "active visible light cycle." The active visible light cycle can last for one or more video image captures depending on the mode for operating the lights. Then, following the active visible light cycle, at step 100 the visible lights 20 can be deactivated in an "inactive visible light cycle," which can also last for one or more video image captures depending on the mode for operating the lights. Then, following the inactive visible light cycle, at step 102 the processor 32 can execute to blend one or more video images captured during the active IR light cycle with one or more video images captured during the active visible light cycle to produce one or more blended video images for the media encoder 30 to produce the encoded media stream. Accordingly, the one or more blended video images can provide color in a foreground for improved detail where such detail is typically most important and grayscale in a background for effective monitoring of a broad field of view. The one or more blended video images could be produced, for example, by tone mapping the one or more video images captured during the active IR light cycle with the one or more video images captured during the active visible light cycle. Then, at step 90, the recording device 12 can transmit the encoded media stream via the I/O communication device 36, and return to step 82, detecting ambient light, and decision step 84, determining sufficiency of such ambient light, in a night mode loop. This loop can continue while insufficient ambient light is being detected by the recording device 12. Although the aforementioned night mode loop is described with the IR light cycles (active and inactive) proceeding before the visible light cycles (active and inactive), the visible light cycles (active and inactive) proceed go before the IR light cycles in the loop.

Figure 4A:
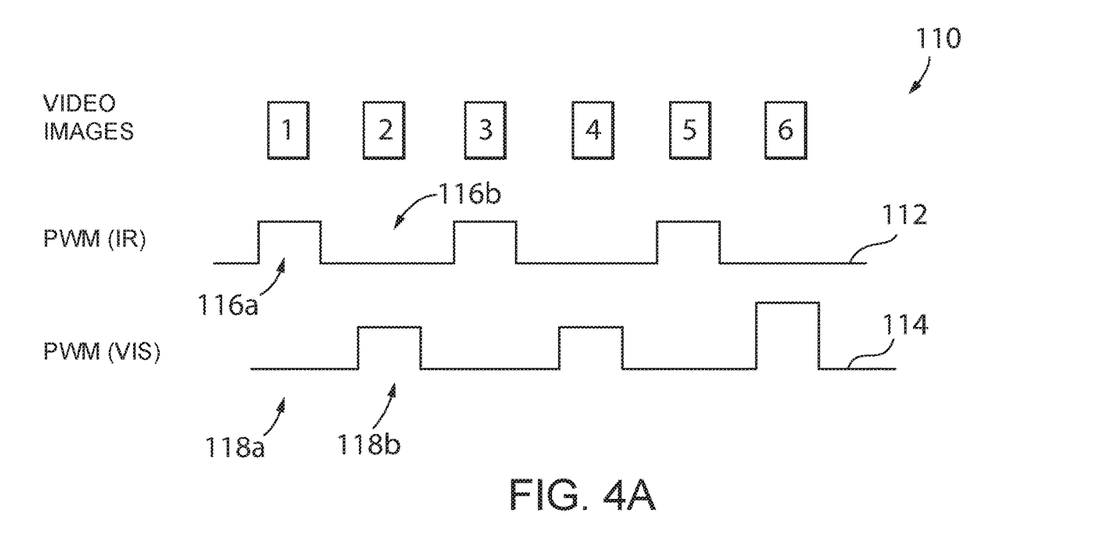
FIG. 4A is an exemplary timing diagram illustrating control of IR and visible lights using Pulse-Width Modulation (PWM) signals in a first mode for producing optimum near field image quality.

Referring now to FIG. 4A, in a first mode 110 for operating the lights, which could be preferred for producing an improved image with optimum near field image quality with rapid visible light, the processor 32 can control one or more IR Pulse-Width Modulation (PWM) signals ("PWM (IR)") 112 for individually controlling the one or more IR lights 19, respectively, and one or more visible PWM signals ("PWM(VIS)") 114 for individually controlling the one or more visible lights 20, respectively. For example, in a repeating pattern, when capturing a first video image ("I"), the processor 32 can assert the IR PWM signals 112 in an active 1R light cycle 116a, while de-asserting the visible PWM signals 114 in an inactive visible light cycle 118b, to capture an IR video image. Then, when capturing a second video image ("2"), the processor 32 can de-assert the IR PWM signals 112 in an inactive IR light cycle 116b, while asserting the visible PWM signals 114 in an active visible light cycle 118a, to capture a visible video image. Accordingly, achieving power conservation, the active visible light cycle 118a can occur during the inactive IR light cycle 116b, and the active IR light cycle 116a can occur during the inactive visible light cycle 118b, minimizing activation of the lights. In this mode, the IR PWM signals 112 and the visible PWM signals 114 could have at least generally equal duty cycles, each being about 50%. As a result, the recording device 12 can capture an equal a number of video images between the active IR light cycles 116a and the active visible light cycles 118a. However, in other modes, the IR PWM signals 112 and the visible PWM signals 114 could have different duty cycles, thereby capturing a different number of video images between the active IR light cycles 116a and the active visible light cycles 118a.

Figure 4B:
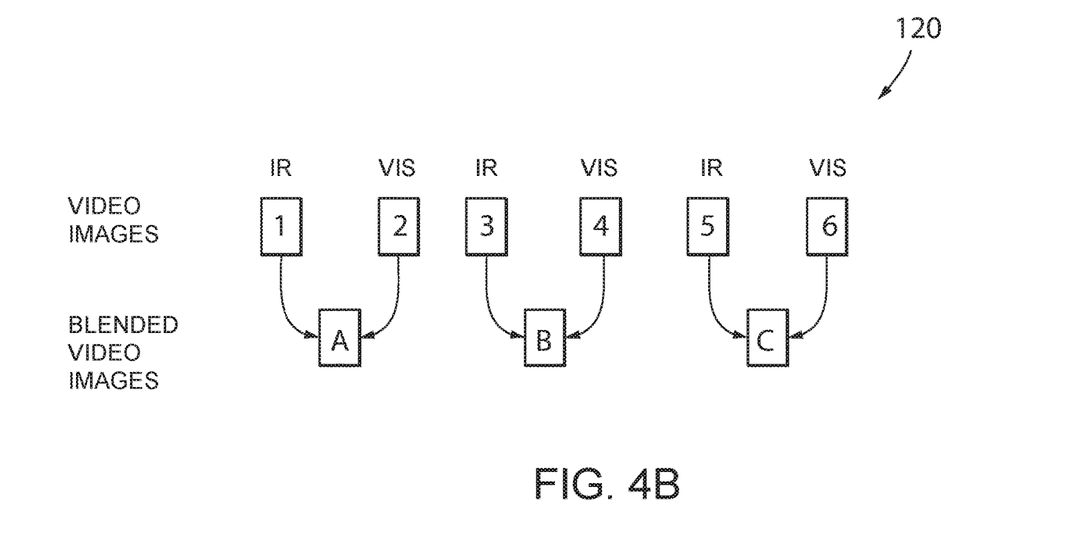
FIG. 4B is an exemplary diagram illustrating blending of images in the first mode, each in accordance with an aspect of the invention.

With additional reference to FIG. 4B, in a blending operation 120, the processor 32 can control the media encoder 30 to blend one or more video images captured during the active IR light cycle 116a with one or more video images captured during the active visible light cycle 118a to produce one or more blended video images for the encoded media stream. For example, for the first mode 110, in a repeating pattern, the processor 32 can blend the first video image ("1") captured during the active IR light cycle 116a ("IR") with the second video image ("2") captured during the active visible light cycle 118a ("VIS") to produce a first blended video image ("A"), such as by tone mapping, and so forth. This may result in blended video image frame rate, such as 12 or 15 fps ("frames per second"), that is about half of the captured video image frame rate, such as 24 or 30 fps, respectively.

Figure 5A:
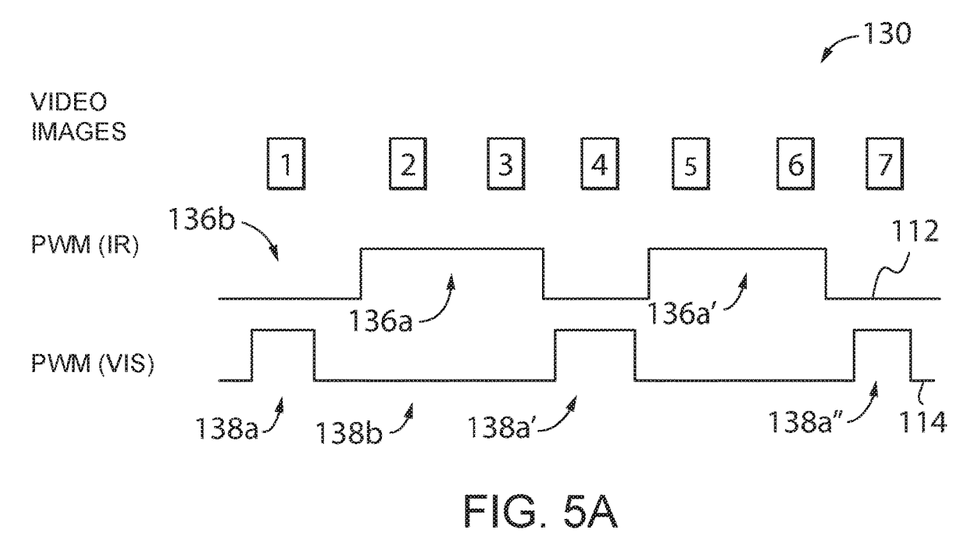
FIG. 5A is an exemplary timing diagram illustrating control of IR and visible lights using Pulse-Width Modulation (PWM) signals in a second mode producing less visible light.

Referring now to FIG. 5A, in a second mode 130 for operating the lights, which could be preferred for producing an improved image with less visible light overall. For example, in a repeating pattern, when capturing a first video image ("1"), the processor 32 can assert the visible PWM signals 114 in an active visible light cycle 138a, while de-asserting the IR PWM signals 112 in an inactive IR light cycle 136b, to capture a visible video image. Then, when capturing a second and third video images ("2, 3"), the processor 32 can de-assert the visible PWM signals 114 in an inactive visible light cycle 138b, while asserting the IR PWM signals 112 in an active IR light cycle 136a, to capture multiple IR video images. Accordingly, achieving power conservation, the active visible light cycle 138a can occur during the inactive IR light cycle 136b, and the active IR light cycle 136a can occur during the inactive visible light cycle 138b, minimizing activation of the lights. In this mode, the IR PWM signals 112 and the visible PWM signals 114 have different duty cycles, with duty cycles of the IR PWM signals 112 being greater than duty cycles of the visible PWM signals 114. As a result, the recording device 12 can capture a greater number of video images in the active IR light cycles 136a than in the active visible light cycles 138a.

Figure 5B:
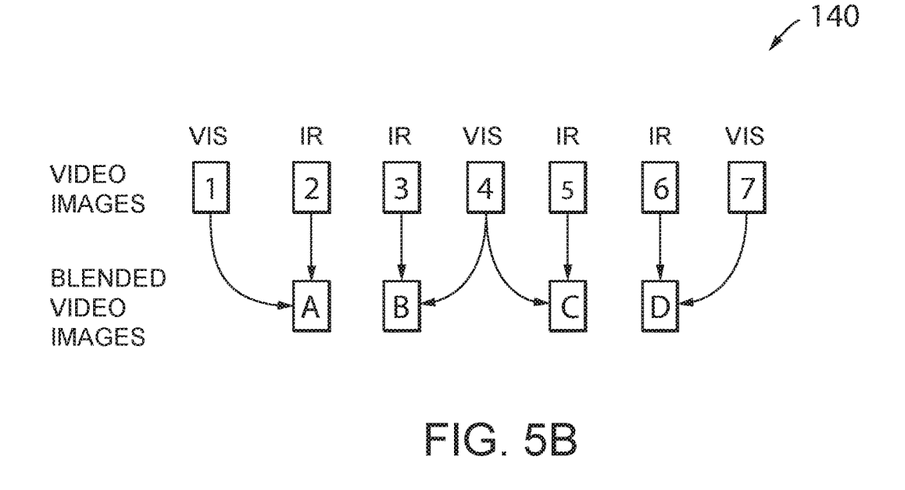
FIG. 5B is an exemplary diagram illustrating blending of images in the second mode, each in accordance with an aspect of the invention.

With additional reference to FIG. 5B, in a blending operation 160, the processor 32 can again control the media encoder 30 to blend video images captured during the active IR light cycle 136a with video images captured during the active visible light cycle 138a to produce the blended video images for the encoded media stream. For example, for the second mode 130, in a repeating pattern, the processor 32 can blend the first video image ("1") captured during the active visible light cycle 138a ("VIS") with the second video image ("2") captured during the active IR light cycle 136a ("IR") to produce a first blended video image ("A"). Then, the processor 32 can blend the third video image ("3")

captured during the active IR light cycle 136a ("IR") with a fourth video image ("4") captured during another active visible light cycle 138a' ("VIS") to produce a second blended video image ("B"). Then, the processor 32 can blend the fourth video image ("4") captured during the active visible light cycle 138a' ("VIS") with a fifth video image ("5") captured during another active IR light cycle 136a' ("IR") to produce a third blended video image ("C"). Then, the processor 32 can blend a sixth video image ("6") captured during the active IR light cycle 136a' ("IR") with a seventh video image ("7") captured during another active visible light cycle 138a" ("IR") to produce a fourth blended video image ("D"), and so forth. This may result in blended video image frame rate, such as 12 or 15 fps, that is about half of the captured video image frame rate, such as 24 or 30 fps, respectively.

Figure 6A:
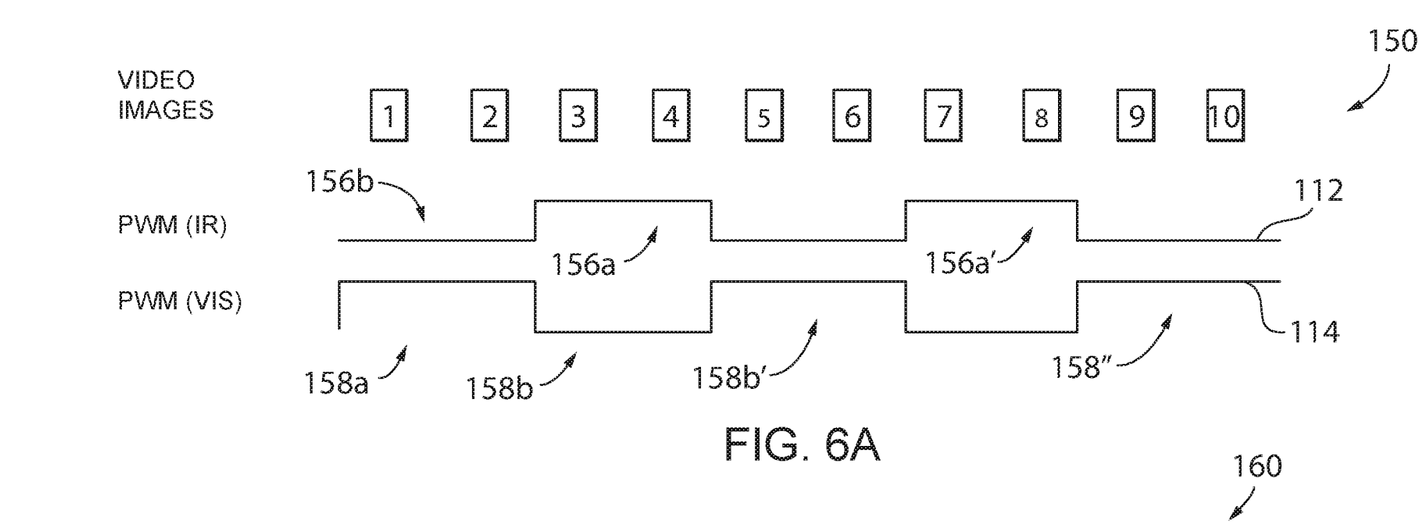
FIG. 6A is an exemplary timing diagram illustrating control of IR and visible lights using Pulse-Width Modulation (PWM) signals in a third mode with extended 1R and visible light periods.

Referring now to FIG. 6A, in a third mode 150 for operating the lights, which could be preferred for extended IR and visible light periods. For example, in a repeating pattern, when capturing first and second video images ("1, 2"), the processor 32 can assert the visible PWM signals 114 in an active visible light cycle 158a, while de-asserting the IR PWM signals 112 in an inactive IR light cycle 156b, to capture multiple visible video images. Then, when capturing third and fourth video images ("3, 4"), the processor 32 can de-assert the visible PWM signals 114 in an inactive visible light cycle 158b, while asserting the IR PWM signals 112 in an active IR light cycle 156a, to capture multiple IR video image. Accordingly, achieving power conservation, the active visible light cycle 158a can occur during the inactive IR light cycle 156b, and the active IR light cycle 156a can occur during the inactive visible light cycle 158b, minimizing activation of the lights. In this mode, the IR PWM signals 112 and the visible PWM signals 114 could have equal duty cycles, each being about 50%. As a result, the recording device 12 can capture an equal a number of video images between the active IR light cycles 116a and the active visible light cycles 118a, each greater than one.

Figure 6B:
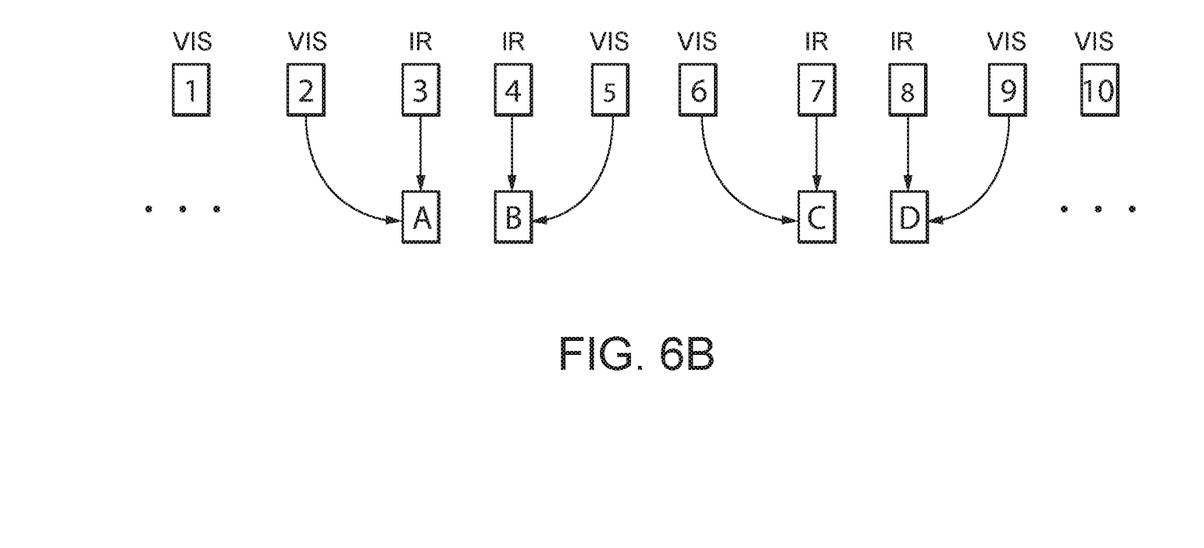
FIG. 6B is an exemplary diagram illustrating blending of images in the third mode, each in accordance with an aspect of the invention.

With additional reference to FIG. 6B, in a blending operation 140, the processor 32 can again control the media encoder 30 to blend video images captured during the active IR light cycle 156a with video images captured during the active visible light cycle 158a to produce the blended video images for the encoded media stream. For example, for the third mode 150, in a repeating pattern, the processor 32 can blend the second video image ("2") captured during the active visible light cycle 158a ("VIS") with the third video image ("3") captured during the active IR light cycle 156a ("IR") to produce a first blended video image ("A"). Note that the first video image ("1") captured during the active visible light cycle 158a ("VIS") would be blended with a previous video image in the pattern (not shown). Then, the processor 32 can blend the fourth video image ("4") captured during the active IR light cycle 156a ("IR") with a fifth video image ("5") captured during another active visible light cycle 158a' ("VIS") to produce a second blended video image ("B"), and so forth. This may result in blended video image frame rate, such as 12 or 15 fps, that is about half of the captured video image frame rate, such as 24 or 30 fps, respectively.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. A system for video monitoring, comprising:
a recording device configured to capture video images for an encoded media stream, the recording device having an infrared (IR) light, a separate visible light and a processor executing a program stored in a non-transient medium to:
activate the IR light while capturing one or more video images in an active IR light cycle and deactivate the IR light while capturing one or more video images in an inactive IR light cycle following the active IR light cycle;
activate the visible light while capturing one or more video images in an active visible light cycle and deactivate the visible light while capturing one or more video images in an inactive visible light cycle following the active visible light cycle, wherein the active visible light cycle occurs during the inactive IR light cycle, and wherein the active IR light cycle occurs during the inactive visible light cycle; and
blend a video image captured during the active IR light cycle with a video image captured during the active visible light cycle to produce a blended video image for the encoded media stream,
wherein the blended video image provides color in a foreground and grayscale in a background, and
wherein the blended video image is produced by tone mapping the video image captured during the active IR light cycle with the video image captured during the active visible light cycle.

2. The system of claim 1, wherein the IR light is controlled by an IR Pulse-Width Modulation (PWM) signal and the visible light is controlled by a visible light PWM signal.

3. The system of claim 2, wherein the IR light PWM signal and the visible light PWM signal have at least generally equal duty cycles.

4. The system of claim 2, wherein the processor further executes to receive a command for selecting between:
a first mode in which the IR light PWM signal and the visible light PWM signal have equal duty cycles; and
a second mode in which the IR light PWM signal and the visible light PWM signal have different duty cycles.

5. The system of claim 1, wherein the processor further executes to determine:
a number of video images to capture during the active IR light cycle; and
a number of video images to capture during the active visible light cycle.

6. The system of claim 5, wherein the processor further executes to receive a command for selecting between:
a first mode in which the number of video images to capture during the active IR light cycle equals the number of video images to capture during the active visible light cycle; and
a second mode in which the number of video images to capture during the active IR light cycle is different from the number of video images to capture during the active visible light cycle.

7. The system of claim 1, further comprising an ambient light sensor, wherein the processor further executes to control the IR and visible lights in cycles after determining ambient light detected by the ambient light sensor to be below a threshold corresponding to a night mode.

8. The system of claim 1, further comprising a base station, wherein the processor further executes to transmit the encoded media stream in an IEEE 802.11 Local Area Network (LAN) wireless connection to the base station.

9. The system of claim 8, wherein the recording device operates as a Real Time Streaming Protocol (RTSP) server and the base station operates as a RTSP client, and wherein the recording device produces the encoded media stream using H.264.

10. A method for video monitoring using a recording device for capturing video images for an encoded media stream, the recording device having an IR light emitter and a separate visible light emitter, the method comprising:
   activating the IR light while capturing one or more video images in an active IR light cycle and deactivating the IR light while capturing one or more video images in an inactive IR light cycle following the active IR light cycle;
   activating the visible light while capturing one or more video images in an active visible light cycle and deactivating the visible light while capturing one or more video images in an inactive visible light cycle following the active visible light cycle, wherein the active visible light cycle occurs during the inactive IR light cycle, and wherein the active IR light cycle occurs during the inactive visible light cycle;
   blending a video image captured during the active IR light cycle with a video image captured during the active visible light cycle to produce a blended video image for the encoded media stream, wherein producing the blended video image provides color in a foreground and grayscale in a background; and
further comprising producing the blended video image by tone mapping the video image captured during the active IR light cycle with the video image captured during the active visible light cycle.

11. The method of claim 10, further comprising controlling the IR light using an IR PWM signal and controlling the visible light using a visible light PWM signal.

12. The method of claim 11, further comprising controlling the IR light PWM signal and the visible light PWM signal to have equal duty cycles.

13. The method of claim 11, further comprising receiving a command for selecting between: controlling the IR light PWM signal and the visible light PWM signal to have equal duty cycles in a first mode; and controlling the IR light PWM signal and the visible light PWM signal to have different duty cycles in a second mode.

14. The method of claim 10, further comprising determining: a number of video images to capture during the active IR light cycle; and a number of video images to capture during the active visible light cycle.

15. The method of claim 10, further comprising controlling the IR and visible lights in cycles after determining ambient light detected by an ambient light sensor to be below a threshold corresponding to a night mode.

16. The system of claim 1, wherein the visible light comprises a white LED.

* * * * *